United States Patent
Kawakami et al.

(10) Patent No.: US 9,219,354 B2
(45) Date of Patent: Dec. 22, 2015

(54) MAIN CIRCUIT SWITCHGEAR

(75) Inventors: Manabu Kawakami, Tokyo (JP); Toru Yamashita, Tokyo (JP); Hirokazu Otani, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 135 days.

(21) Appl. No.: 14/239,320

(22) PCT Filed: Sep. 28, 2011

(86) PCT No.: PCT/JP2011/072243
§ 371 (c)(1),
(2), (4) Date: Feb. 18, 2014

(87) PCT Pub. No.: WO2013/046371
PCT Pub. Date: Apr. 4, 2013

(65) Prior Publication Data
US 2014/0198429 A1 Jul. 17, 2014

(51) Int. Cl.
*H02B 13/00* (2006.01)
*H02B 13/02* (2006.01)
*H01H 31/32* (2006.01)

(52) U.S. Cl.
CPC .............. *H02B 13/02* (2013.01); *H01H 31/32* (2013.01)

(58) Field of Classification Search
CPC .................... H02B 13/00–13/08; H02B 1/011; H02B 1/46–1/48; H02B 7/01; H01H 31/32
USPC ................................................. 361/600–621
See application file for complete search history.

(56) References Cited

U.S. PATENT DOCUMENTS

| | | | | | |
|---|---|---|---|---|---|
| 3,235,774 | A | * | 2/1966 | Frowein | H02B 1/22 218/101 |
| 4,209,821 | A | * | 6/1980 | Kobayashi | H02B 5/06 200/50.27 |
| 4,829,400 | A | * | 5/1989 | Enomoto | H02B 1/22 361/612 |

FOREIGN PATENT DOCUMENTS

| | | | |
|---|---|---|---|
| CN | 1340233 A | 3/2002 | |
| DE | 1240164 B | * 5/1967 | ............... H02B 7/01 |

(Continued)

OTHER PUBLICATIONS

International Search Report (PCT/ISA/210) mailed on Nov. 1, 2011, by the Japanese Patent Office as the International Searching Authority for International Application No. PCT/JP2011/072243.

(Continued)

*Primary Examiner* — Zachary M Pape
(74) *Attorney, Agent, or Firm* — Buchanan Ingersoll & Rooney PC

(57) ABSTRACT

There is provided a main circuit switchgear that includes a breaker; a leg part that supports the breaker; a disconnector that is connected to the breaker; a leg part that supports the disconnector; a metal container that accommodates therein the breaker and the disconnector and includes a bottom plate in which an opening is provided at a position corresponding to a position of the leg part, where the leg part is fixed onto the bottom plate, and a support frame that includes a top panel on which the bottom plate is placed and a leg part that supports the top panel, where the leg part is fixed onto the top panel via the opening.

2 Claims, 3 Drawing Sheets

(56) References Cited

FOREIGN PATENT DOCUMENTS

| | | |
|---|---|---|
| DE | 4014099 A1 | 11/1991 |
| JP | 59-89506 A | 5/1984 |
| JP | 63-116325 A | 5/1988 |
| JP | 64-074007 A | 3/1989 |
| JP | 2000-092635 A | 3/2000 |
| JP | 2000-270428 A | 9/2000 |
| JP | 2002-186126 A | 6/2002 |
| JP | 2008-113516 A | 5/2008 |
| JP | 2010-135327 A | 6/2010 |

OTHER PUBLICATIONS

Written Opinion (PCT/ISA/237) mailed on Nov. 1, 2011, by the Japanese Patent Office as the International Searching Authority for International Application No. PCT/JP2011/072243.

Office Action issued on May 6, 2015, by the Chinese Patent Office in corresponding Chinese Patent Application No. 201180073677.2, and an English Translation of the Office Action. (10 pages).

* cited by examiner

MAIN CIRCUIT SWITCHGEAR

FIELD

The present invention relates to a main circuit switchgear, and more particularly to a main circuit switchgear that is installed between a main generator and a main transformer in a power generation plant.

BACKGROUND

A high-pressure synchronous system and a low-pressure synchronous system have been known as an activation system of a main generator in a power generation plant (see Patent Literature 1). In the high-pressure synchronous system, a main generator needs to be directly connected to a main transformer and an activation transformer needs to be also provided. On the other hand, according to the low-pressure synchronous system, while a main circuit switchgear is provided between a main generator and a main transformer, an activation transformer is not supposed to be required.

In the main circuit switchgear of a low-pressure synchronous system described in Patent Literature 1, a breaking part and a disconnecting part that are accommodated in a first metal container (a casing) are mounted on a support frame. That is, the breaking part and the disconnecting part are directly fixed onto a top panel that constitutes the support frame. Furthermore, accessory devices other than the breaking part and the disconnecting part such as a capacitor, an arrester, and an instrument transformer are mounted on a mounting plate, which is placed below the top panel of the support frame.

CITATION LIST

Patent Literature

Patent Literature 1: Japanese Patent Application Laid-open No. 2002-186126 (FIG. 1)

SUMMARY

Technical Problem

A support frame of a main circuit switchgear is formed of iron, which has high rigidity, so as to be capable of withstanding a large impact force caused by a switching operation of a breaking part, and generally has many reinforced portions and welded portions. Because the main circuit switchgear described in Patent Literature 1 has a configuration in which both a breaking part and a disconnecting part are fixed, there has been a problem in that the number of reinforced portions and welded portions is further increased.

Furthermore, the main circuit switchgear described in Patent Literature 1 has had a problem in that, in order to mount the breaking part and the disconnecting part, the top of a support frame needs to be constituted by a top panel formed of a plate whose entire surface is made of metal, so that the weight of the top panel is increased and the cost is incurred.

The present invention has been achieved in view of the above problems, and an object of the present invention is to provide a main circuit switchgear that can reduce the number of reinforced portions and welded portions of a support frame to simplify the configuration of the support frame and that can also reduce the weight of a top panel of the support frame.

Solution to Problem

There is provided a main circuit switchgear according to an aspect of the present invention including: a breaker; a breaker leg part that supports the breaker; a disconnector that is connected to the breaker; a disconnector leg part that supports the disconnector; a casing that accommodates therein the breaker and the disconnector and includes a flat-plate-shaped bottom in which an opening is provided at a position corresponding to a position of the breaker leg part, where the disconnector leg part is fixed onto the bottom; and a support frame that includes a top plate on which the bottom of the casing is placed and a frame leg part that supports the top panel, where a lower end portion of the breaker leg part is inserted into an opening of the casing and the breaker leg part is fixed onto the top panel via the opening.

Advantageous Effects of Invention

According to the present invention, the number of reinforced portions and welded portions of a support frame can be reduced to simplify the configuration of the support frame, and the weight of a top panel of the support frame can be also reduced.

DESCRIPTION OF EMBODIMENTS

Exemplary embodiments of a main circuit switchgear according to the present invention will be explained below in detail with reference to the accompanying drawings. The present invention is not limited to the embodiments.

Embodiment

Figure 1:
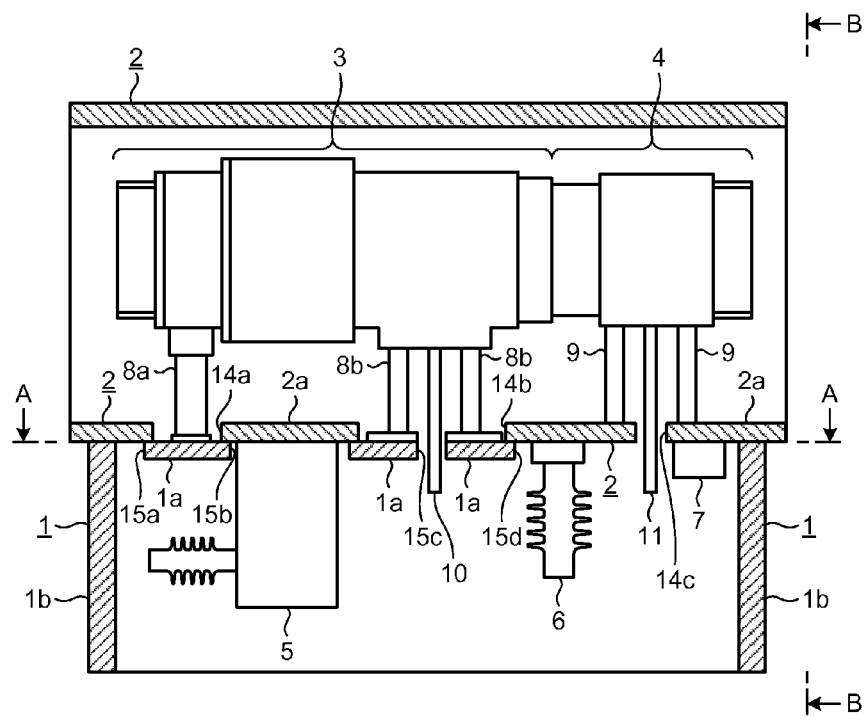
FIG. 1 depicts a configuration of a vertical cross section of a main circuit switchgear according to an embodiment.
Figure 2:
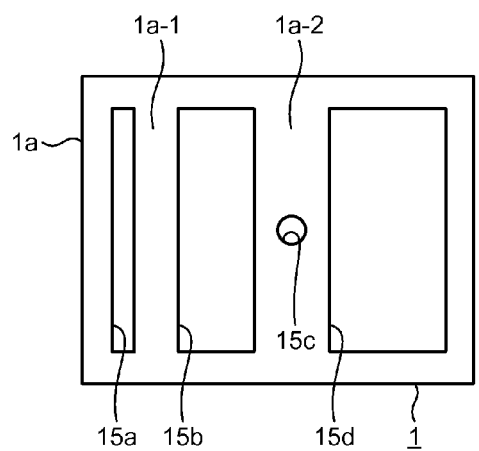
FIG. 2 depicts a planar configuration of a support frame using a cross sectional view taken along an arrow A-A in FIG. 1.
Figure 3:
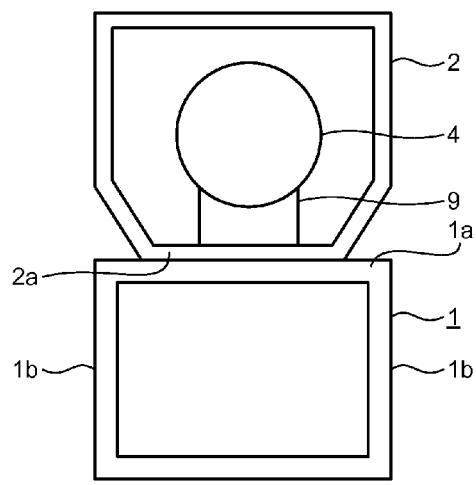
FIG. 3 is a cross-sectional view taken along an arrow B-B in FIG. 1.
Figure 4:
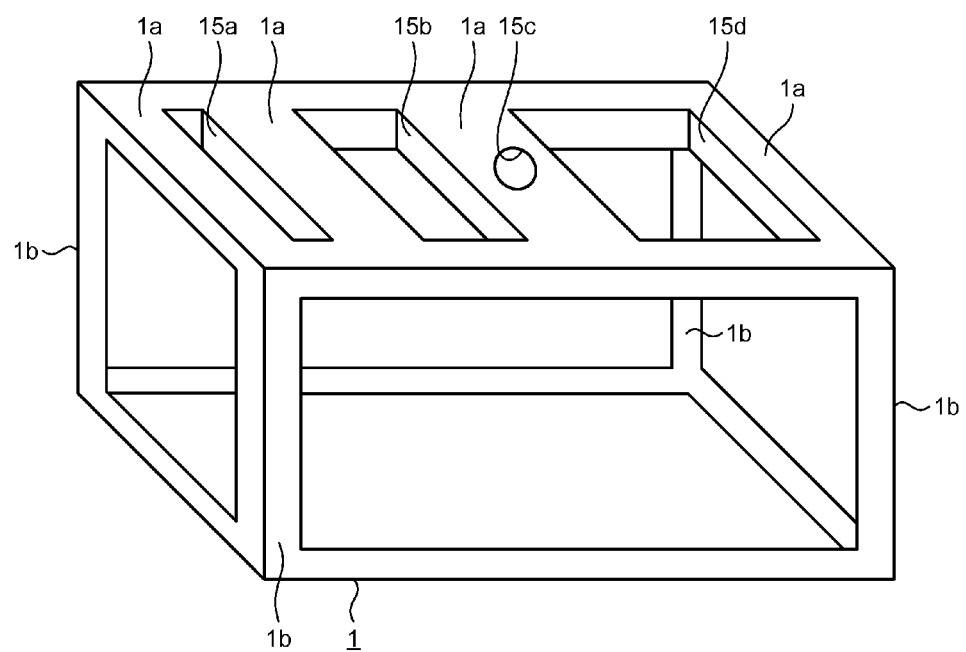
FIG. 4 is a perspective view of a support frame.

FIG. 1 depicts a configuration of a vertical cross section of a main circuit switchgear according to an embodiment of the present invention. FIG. 2 depicts a planar configuration of a support frame using a cross sectional view taken along an arrow A-A in FIG. 1. FIG. 3 is a cross-sectional view taken along an arrow B-B in FIG. 1. FIG. 4 is a perspective view of a support frame. A configuration of the main circuit switchgear according to the present embodiment is explained below with reference to FIGS. 1 to 4.

The main circuit switchgear according to the present embodiment includes a support frame 1; a metal container 2 that is mounted on the support frame 1 and serves as a casing; a breaker 3 that is accommodated in the metal container 2 and supported by the support frame 1 via leg parts 8a and 8b that are fixed onto a top panel 1a of the support frame 1; a disconnector 4 that is accommodated in the metal container 2, connected to the breaker 3, and supported by the metal container 2 via a leg part 9 that is fixed onto an inner bottom of the metal container 2; and a capacitor 5, an arrester 6, and an instrument transformer 7 that are suspended from an outer bottom of the metal container 2.

The support frame 1 includes the top panel 1a and a leg part 1b that is mounted on the top panel 1a. The top panel 1a is formed of a plate-shaped metal member and includes, for example, four openings 15a to 15d. The openings 15a, 15b, and 15d have, for example, a rectangular shape and the opening 15c has, for example, a circular shape. The opening 15c is provided between the openings 15b and 15d. An area of the top panel 1a between the openings 15a and 15b forms a breaker supporting part 1a-1 that serves as a support member for the breaker 3, and the area is used for fixing a lower end portion of the leg part 8a thereto. An area of the top panel 1a between the openings 15b and 15d other than the opening 15c forms a breaker supporting part 1a-2 that serves as a support member for the breaker 3, and the area is used for fixing a lower end portion of the leg part 8b thereto. For example, the top panel 1a can be made by joining a plurality of plate-shaped members to each other by combination welding and the like. The leg part 1b of the support frame 1 is constituted by four legs, for example. The leg part 1b is formed of a metal member and the top panel 1a is provided on the top thereof. For example, the support frame 1 is formed of iron and has high rigidity.

The metal container 2 is mounted on the top panel 1a. The metal container 2 has a tubular shape and serves as a casing of the main circuit switchgear. The bottom of the metal container 2 forms a flat-plate-shaped bottom plate 2a. The bottom plate 2a is placed on the top panel 1a in a stacked manner and fixed to the top panel 1a. Openings 14a to 14c are provided in the bottom plate 2a. The opening 14a is arranged above the breaker supporting part 1a-1 and the lower end portion of the leg part 8a is inserted into the opening 14a to be fixed onto the breaker supporting part 1a-1. That is, the opening 14a has a size that at least allows the leg part 8a to be insertable and is arranged at a position corresponding to the leg part 8a. For example, the leg part 8a has a rod shape and is provided in pairs. The opening 14b is arranged above the breaker supporting part 1a-2 and the lower end portion of the leg part 8b is inserted into the opening 14b to be fixed onto the breaker supporting part 1a-2. That is, the opening 14b has a size that at least allows the leg part 8b to be insertable and is arranged at a position corresponding to the leg part 8b. The leg part 8b has a cylindrical shape, for example. A lower end portion of the leg part 9 of the disconnector 4 is fixed onto the bottom plate 2a. In this manner, the breaker 3 is supported by the leg parts 8a and 8b that are mounted on the top panel 1a of the frame 1. Meanwhile, the disconnector 4 is supported by the leg part 9 mounted on the bottom plate 2a of the metal container 2. Because the metal container 2 is not required to have rigidity as high as that of the support frame 1, the metal container 2 can be formed of aluminum, for example.

So-called accessory devices, which are constituent devices of the main circuit switchgear other than the breaker 3 and the disconnector 4, are mounted on the bottom plate 2a outside the metal container 2. Specifically, for example, the surge absorbing capacitor 5, the arrester 6, and the instrument transformer 7 are mounted on a lower surface of the bottom plate 2a and suspended from the bottom plate 2a. The capacitor 5 is mounted on the bottom plate 2a via the opening 15b that is provided on the top panel 1a. The opening 15b is provided between the breaker supporting parts 1a-1 and 1a-2 that support the leg parts 8a and 8b respectively in an axial direction. The arrester 6 and the instrument transformer 7 are mounted on the bottom plate 2a via the opening 15d that is provided on the top panel 1a. The accessory devices are omitted in FIG. 3. In addition, the accessory devices are not limited to these specific examples.

The breaker 3 and the disconnector 4 are serially connected to each other along an axial direction of the metal container 2 and accommodated in the metal container 2. The breaker 3 includes a movable contact (not shown), a fixed contact (not shown) that is moved toward or away from the movable contact, and the like, within a tubular metal container having an insulating gas filled therein. The movable contact of the breaker 3 is coupled to an operating rod 10 that is coupled to an operating device (not shown). The operating rod 10 successively passes through the openings 14b and 15c to be extended below the top panel 1a. Furthermore, the disconnector 4 includes a movable contact (not shown), a fixed contact (not shown) that is moved toward or away from the movable contact, and the like, within a tubular metal container having an insulating gas filled therein. The movable contact of the disconnector 4 is coupled to an operating rod 11 that is coupled to an operating device (not shown). The operating rod 11 passes through the opening 14c to be extended below the top panel 1a.

For example, the breaker 3 is connected to a generator (not shown), and the disconnector 4 is connected to a transformer (not shown). For example, the main circuit switchgear according to the present embodiment is installed between a main generator and a main transformer in a power generation plant.

Next, an operation of the present embodiment is explained. The breaker 3 and the disconnector 4 are respectively switched by operating their operating devices (not shown). The breaker 3 is instantaneously driven by an operating device having a large operating force to extinguish an arc between electrodes, and thus a large force acts on the leg parts 8a and 8b of the breaker 3 and the support frame 1. Therefore, the strength of the support frame 1 needs to be enhanced and the breaker 3 is mounted on the support frame 1 having enhanced strength. The breaker supporting parts 1a-1 and 1a-2 that support the leg parts 8a and 8b of the breaker 3 are parts that particularly require strength, and thus it suffices to enhance the strength of a support member that constitutes the breaker supporting parts 1a-1 and 1a-2. Meanwhile, the disconnector 4 does not need to be instantaneously switched, and thus any impact force does not act on the leg part 9 of the disconnector 4. Therefore, the strength of a support part for the leg part 9 does not need to be enhanced. Accordingly, the present embodiment employs a configuration such that the leg part 9 of the disconnector 4 is mounted on the metal container 2 whose strength is lower than that of the support frame 1.

Furthermore, because the capacitor 5, the arrester 6, and the instrument transformer 7 that serve as accessory devices are not driven by an operating device and are stationary, any impact force is not generated from these devices. Therefore, high strength is not required for supporting these accessory devices and sufficient support strength is ensured with a configuration in which these accessory devices are suspended from a lower surface of the bottom plate 2a of the metal container 2.

Figure 5:
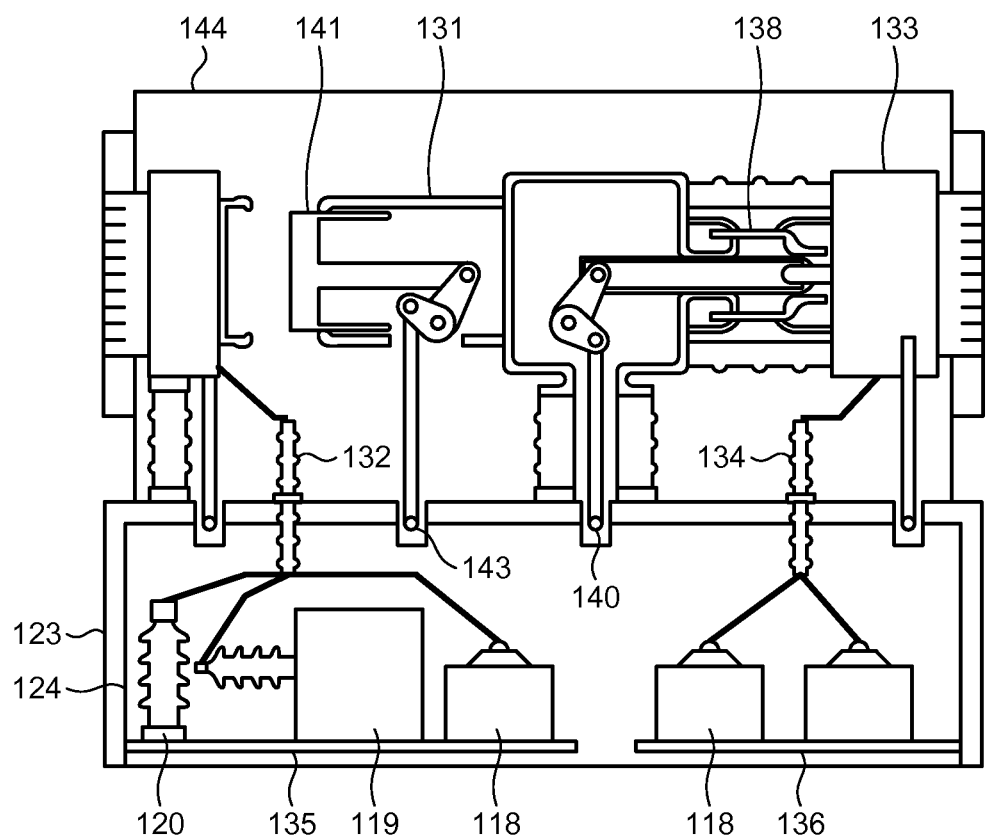
FIG. 5 is a front view of a device configuration of a main circuit switchgear described in Patent Literature 1.

The main circuit switchgear according to the present embodiment is compared to a conventional main circuit switchgear. FIG. 5 is a front view of a device configuration of the main circuit switchgear described in Patent Literature 1. As shown in FIG. 5, a metal container 144 that serves as a casing is placed on a support frame 123, and a breaking part 133, a breaking-part movable contact 138, a disconnecting part 131, and a disconnecting-part movable contact 141 are accommodated in the metal container 144. The breaking-part movable contact 138 is coupled to an operating shaft 140 and the disconnecting-part movable contact 141 is coupled to an operating shaft 143. A metal container 124 is provided below the support frame 123. An instrument transformer 118, a surge absorbing capacitor 119, and an arrester 120 that are connected via a bushing 132 to the disconnecting part 131 and integrally mounted on a mounting plate 135 are accommodated in the metal container 124. Another instrument transformer 118 that is connected via a bushing 134 to the breaking part 133 and mounted on a mounting plate 136 is also accommodated in the metal container 124.

The conventional main circuit switchgear that is constituted as shown in FIG. 5 has a configuration in which the support frame 123 fixes both the breaking part 133 and the disconnecting part 131 thereon. Therefore, the conventional main circuit switchgear has had a problem that the number of reinforced portions and welded portions is increased. The top of the support frame 123 needs to be constituted by a top panel formed of one metal plate to mount the breaking part 133 and the disconnecting part 131 thereon. Therefore, there has been a problem in that the weight of the top panel is increased and a certain cost is incurred.

In the present embodiment, because the support frame 1 directly supports the breaker 3 and the disconnector 4 is supported by the metal container 2 that serves as a casing, it suffices that particularly the strength of the breaker supporting parts 1a-1 and 1a-2 of the support frame 1 is enhanced. As compared to the configuration of the conventional main circuit switchgear mentioned above, the number of reinforced portions and welded portions can be reduced and the configuration of the support frame 1 is simplified.

In the present embodiment, the openings 15b and 15d for suspending accessory devices from the metal container 2 are provided on the top panel 1a of the support frame 1. As compared to a case where a top panel is formed of one plate as in the conventional main circuit switchgear, the weight of the top panel 1a can be reduced.

Furthermore, the conventional main circuit switchgear has had a problem in that a mounting plate for mounting accessory devices thereon is required and thus a cost therefor is incurred. In contrast, in the present embodiment, any mounting plate is not required for mounting accessory devices and also a cost therefor can be reduced.

As described above, according to the present embodiment, with the support frame 1 that has a simple configuration in which only the strength of a required part is enhanced, the support frame 1 can be downsized, the weight thereof can be reduced, and a cost therefor can be reduced.

INDUSTRIAL APPLICABILITY

The present invention is useful as a main circuit switchgear, and is particularly suitable for a power-generation main circuit switchgear that is used between a main generator and a main transformer in a low-pressure synchronous system of a power generation plant.

REFERENCE SIGNS LIST

1 support frame
1a top panel
1a-1, 1a-2 breaker supporting part
1b, 8a, 8b, 9 leg part
2 metal container
2a bottom plate
3 breaker
4 disconnector
5 capacitor
6 arrester
7 instrument transformer
10, 11 operating rod
14a to 14c, 15a to 15d opening
118 instrument transformer
119 capacitor
120 arrester
123 support frame
124 metal container
131 disconnecting part
133 breaking part
132, 134 bushing
138 breaking-part movable contact
141 disconnecting-part movable contact
135, 136 mounting plate

The invention claimed is:

1. A main circuit switchgear comprising:
a breaker;
a breaker leg part that supports the breaker;
a disconnector that is connected to the breaker;
a disconnector leg part that supports the disconnector;
a casing that accommodates therein the breaker and the disconnector and includes a flat-plate-shaped bottom in which an opening is provided at a position corresponding to a position of the breaker leg part, where the disconnector leg part is fixed onto the bottom; and
a support frame that includes a top plate on which the bottom of the casing is placed and a frame leg part that supports the top panel, where a lower end portion of the breaker leg part is inserted into an opening of the casing and the breaker leg part is fixed onto the top panel via the opening.

2. The main circuit switchgear according to claim 1, wherein an opening is provided in the top panel at a portion other than a part onto which the lower end portion of the breaker leg part is fixed, and an accessory device is suspended from a lower surface of the bottom of the casing via the opening.

\* \* \* \* \*